United States Patent [19]
Kamiyama et al.

[11] Patent Number: 5,930,141
[45] Date of Patent: Jul. 27, 1999

[54] METHOD OF CONTROLLING ACCESS TO STORAGE MEANS IN NUMERICAL-CONTROL SYSTEM, AND NUMERICAL-CONTROL SYSTEM

[75] Inventors: Eiryou Kamiyama, Chiba; Atsushi Terashima, Ibaraki, both of Japan

[73] Assignee: Hitchi Seiki Co., Ltd., Abiko, Japan

[21] Appl. No.: 08/754,301

[22] Filed: Nov. 20, 1996

[30] Foreign Application Priority Data

Dec. 21, 1995 [JP] Japan .................................. 7-348984

[51] Int. Cl.[6] .................................................. G05B 19/403
[52] U.S. Cl. ............................. 364/474.01; 364/474.22; 711/158
[58] Field of Search .................................. 364/134, 132, 364/474.01, 474.23; 395/84, 591, 825; 318/567

[56] References Cited

U.S. PATENT DOCUMENTS

| | | | |
|---|---|---|---|
| 4,118,771 | 10/1978 | Pomella et al. | 364/134 |
| 4,288,849 | 9/1981 | Yoshida et al. | 364/132 |
| 4,396,987 | 8/1983 | Inaba et al. | 395/84 |
| 4,888,534 | 12/1989 | Kuchiki | 318/567 |
| 5,095,426 | 3/1992 | Senta | 395/591 |
| 5,148,371 | 9/1992 | Kurakake et al. | 364/474.01 |
| 5,229,950 | 7/1993 | Niwa | 364/474.23 |
| 5,625,840 | 4/1997 | Numata et al. | 395/825 |

*Primary Examiner*—Tod R. Swann
*Assistant Examiner*—Fred F. Tzeng
*Attorney, Agent, or Firm*—Armstrong, Westerman, Hattori, McLeland & Naughton

[57] ABSTRACT

A storage means access control method for an NC system, which has no adverse effect on the execution of an NC instruction. The NC system has a first storage means and a second storage means having an access time longer than that of the first storage means, and sequentially executes NC instructions in blocks of an NC program stored in the first storage means, block by block. The NC instructions in the blocks of the NC program are previously classified into waitable instructions and unwaitable instructions. When there is a request for access to the second storage means during execution of the NC program, if an NC instruction in an execution block to be executed subsequently is a waitable instruction, access to the second storage means is executed after the NC instruction in the execution block has been executed. If the NC instruction in the execution block is an unwaitable instruction, access to the second storage means is not executed after the NC instruction in the execution block has been executed.

5 Claims, 3 Drawing Sheets

```
Example of NC program

O1234 ;
N001 G54 G90 ;
N002 S250 M03 ;
N003 G00 X0 Y0 ;
N004 Z-9.8 ;
N005 G01 G41 Y40.0 D21 F60 ;
N006 G03 X0 Y40.0 J-40.0 ;
N007 G00 G40 Y0 ;
N008 Z-10.0 ;
         :
         :
```

METHOD OF CONTROLLING ACCESS TO STORAGE MEANS IN NUMERICAL-CONTROL SYSTEM, AND NUMERICAL-CONTROL SYSTEM

BACKGROUND OF THE INVENTION

1. Field of the Invention

The present invention relates to a storage means access control method applied to a numerically-controlled (hereinafter referred to as "NC") system for a machine tool or the like, which has a first storage means and a second storage means having an access time longer than that of the first storage means, to control access to the second storage means. The present invention also relates to such an NC system.

2. Related Background Art

Recently, with the progress of numerically-controlled machine tools, there has been an increasing demand for NC systems. A typical existing NC system contains a CPU( e.g., a microprocessor), and has a part that analyzes an NC program and sends a control signal to a servomotor for each control axis, and a part that executes sequence control (such as, tool change). Such an NC system can be realized by using a general-purpose computer. If an NC system is realized by using a general-purpose personal computer (hereinafter referred to as "personal computer"), which is now available at low cost, it is possible to reduce the cost of the NC system. The term "personal computer" herein used means a small-sized general-purpose computer for personal use (for a single user), and it includes FA personal computers (i.e., personal computers for factory use) in addition to so-called OA personal computers (i.e., personal computers for business use).

A special-purpose NC system is required to exhibit a high level of real-time performance. Therefore, all necessary data, including data concerning an NC program to be executed by the NC system and a program and data concerning another task to be performed in parallel by multitask processing, is stored in a main memory comprising a semiconductor memory. In an NC system using a personal computer, the personal computer contains a magnetic disk unit,(e.g., a hard disk unit), in addition to a main memory comprising a semiconductor memory. In multitask processing, a task other than a task of processing an NC program may make access to the magnetic disk. For example, there are cases where an NC program other than one that is being executed is input, edited and saved to the magnetic disk, and where an NC program other than one that is being executed is read out from the magnetic disk to modify it. When the magnetic disk is accessed as described above, the processing executed by the CPU is monopolized by the disk access. Therefore, other processing cannot be executed during the disk access.

Thus, in a personal computer, the processing executed by the CPU is monopolized by the access to a magnetic disk unit or the like; therefore, no other task can be carried out during the disk access. Accordingly, a task being carried out to process an NC program may be suspended, or a wait may occur between an NC instruction which is being executed and a subsequent NC instruction. If such a wait occurs during control of a machine tool, for example, the tool temporarily stops on the machining path, and it becomes impossible to maintain the continuity in the motion of the tool. This has an adverse effect on the machining process, such as a feed mark made on the machined surface of a workpiece.

SUMMARY OF THE INVENTION

An object of the present invention is to provide a storage means access control method for an NC system, which has no adverse effect on the execution of an NC instruction, and also provide an NC system.

The present invention provides a storage means access control method for a numerical-control system which has a first storage means and a second storage means having an access time longer than that of the first storage means, wherein numerical-control instructions in blocks of a numerical-control program stored in the first storage means are sequentially executed block by block. According to the storage means access control method, the numerical-control instructions in the blocks of the numerical-control program are previously classified into waitable instructions which allow a wait between execution thereof and execution of a numerical-control instruction in a subsequent block, and unwaitable instructions which disallow a wait between execution thereof and execution of a numerical-control instruction in a subsequent block. When there is a request for access to the second storage means during execution of the numerical-control program, if a numerical-control instruction in an execution block, which is a block to be executed subsequently, is a waitable instruction, access to the second storage means is executed after the numerical-control instruction in the execution block has been executed. If the numerical-control instruction in the execution block is an unwaitable instruction, processing of a subsequent block is executed after the numerical-control instruction in the execution block has been executed without executing access to the second storage means.

In the above-described storage means access control method, the numerical-control system may be one that controls a machine tool. In this case, the waitable instructions may be instructions which are not accompanied by machining of a workpiece, and the unwaitable instructions may be instructions for the machine tool to machine a workpiece.

In addition, the present invention provides a numerical-control system having a first storage means and a second storage means having an access time longer than that of the first storage means, wherein numerical-control instructions in blocks of a numerical-control program stored in the first storage means are sequentially executed (i.e. converted into control signals) block by block. The numerical-control system includes an instruction type storage means for previously storing the numerical-control instructions in the blocks of the numerical-control program, the numerical-control instructions being classified into waitable instructions which allow a wait between execution thereof and execution of a numerical-control instruction in a subsequent block, and unwaitable instructions which disallow a wait between execution thereof and execution of a numerical-control instruction in a subsequent block. The numerical-control system further includes an access control means for judging, when there is a request for access to the second storage means during execution of the numerical-control program, whether or not a numerical-control instruction in an execution block, which is a block to be executed subsequently, is a waitable instruction. If the numerical-control instruction is a waitable instruction, the access control means executes access to the second storage means after the numerical-control instruction in the execution block has been executed. If the numerical-control instruction in the execution block is an unwaitable instruction, the access control means executes processing of a subsequent block after the numerical-control instruction in the execution block has been executed without executing access to the second storage means.

The above-described numerical-control system may be one that controls a machine tool. In this case, the waitable instructions may be instructions which are not accompanied by machining of a workpiece, and the unwaitable instructions may be instructions for the machine tool to machine a workpiece.

In the above-described numerical-control system, it is preferable that the first storage means should be a semiconductor memory, and the second storage means should be an external storage.

BRIEF DESCRIPTION OF THE DRAWINGS

The present invention may be more fully understood from the description of preferred embodiments of the invention set forth below, together with the accompanying drawings, in which.

DESCRIPTION OF THE PREFERRED EMBODIMENTS

An embodiment of the present invention will be described below in detail with reference to the accompanying drawings.

Figure 1:
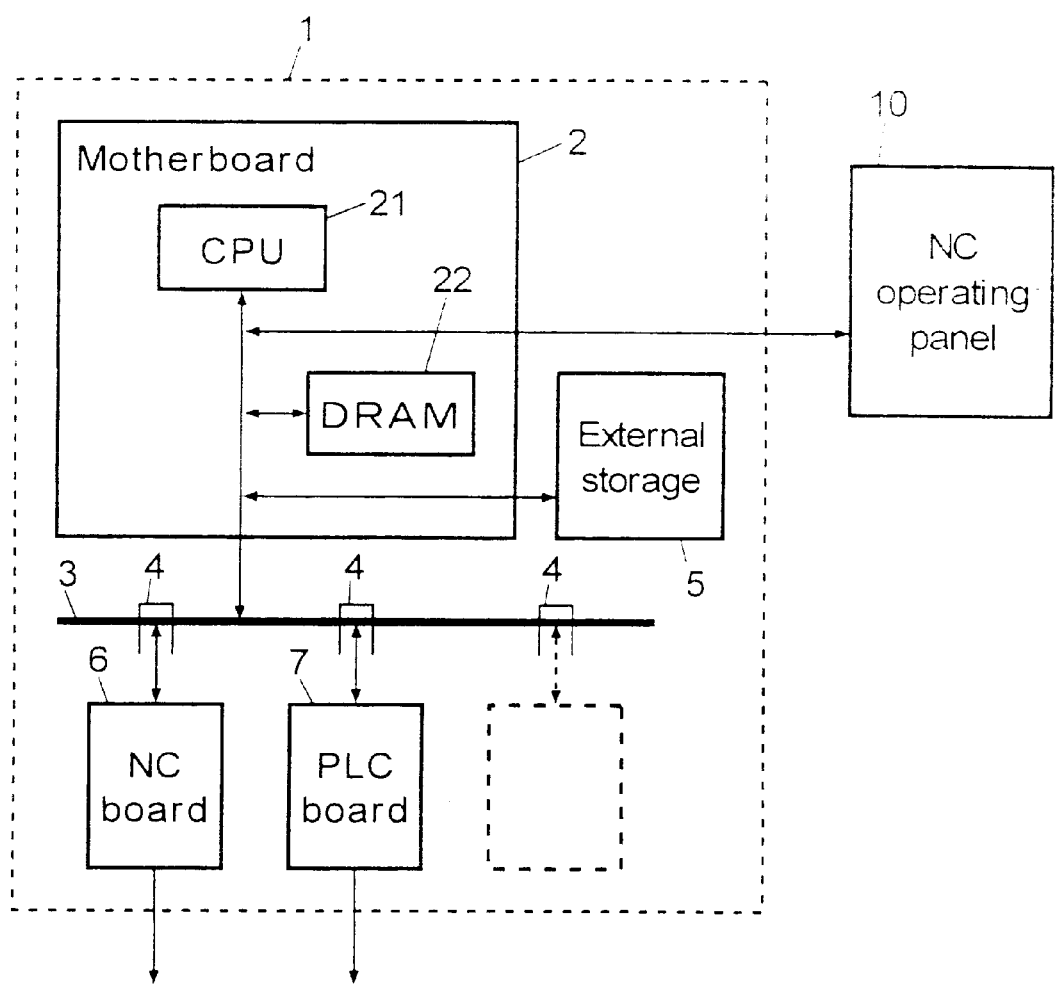
FIG. 1 is a block diagram showing the structural arrangement of an NC system according to the present invention.

FIG. 1 shows the structural arrangement of an NC system according to the present invention. A personal computer 1 has a motherboard 2 including a CPU 21 (e.g., a microprocessor), a main memory 22 comprising a semiconductor memory (e.g., a DRAM), an interrupt controller, a bus controller, etc. The personal computer 1 further has a main bus 3 connected to the motherboard 2, and a plurality of expansion slots 4 provided on the main bus 3. The expansion slots 4 are designed to hold various input/output expansion boards, an interface board for an external storage, etc. and connect them to the main bus 3; thereby, making it possible to expand the functionality of the personal computer 1. The main bus 3 is a bus for connecting such expansion boards and the motherboard 2. The CPU 21 on the motherboard 2 accesses each expansion board through the main bus 3. The data bus width of the main bus 3 is either 16 bits or 32 bits.

An external storage 5, which is contained in the personal computer 1, is connected directly to the motherboard 2 without interposing the main bus 3 therebetween. The external storage 5 includes a flexible disk unit, a hard disk unit, a magneto-optical disk unit, etc. An NC operating panel 10 is connected to the motherboard 2 through a serial port, a CRT interface, etc. The NC operating panel 10 is equipped with a display unit (e.g. a CRT), and a keyboard having film switches, etc. to enable entry and editing of an NC program. The display unit on the NC operating panel 10 can display coordinate values of control axes. In the case of control of a machine tool by way of example, the display unit can also display the position of a tool and the position of a table. If necessary, the NC operating panel 10 may be further equipped with a flexible disk drive or a paper-tape reader as an NC program input unit.

An NC board 6 is installed into one of the expansion slots 4 to send a control signal to a servomotor for each control axis. A PLC (Programmable Logic Control) board 7 is installed into another expansion slot 4. The PLC board 7 is used to output a control signal for sequence control and to input information concerning the position of each movable member. If it is possible to integrate the NC board 6 and the PLC board 7 into a single expansion board, only one expansion slot 4 will be necessary to use.

Figures 2, 3:
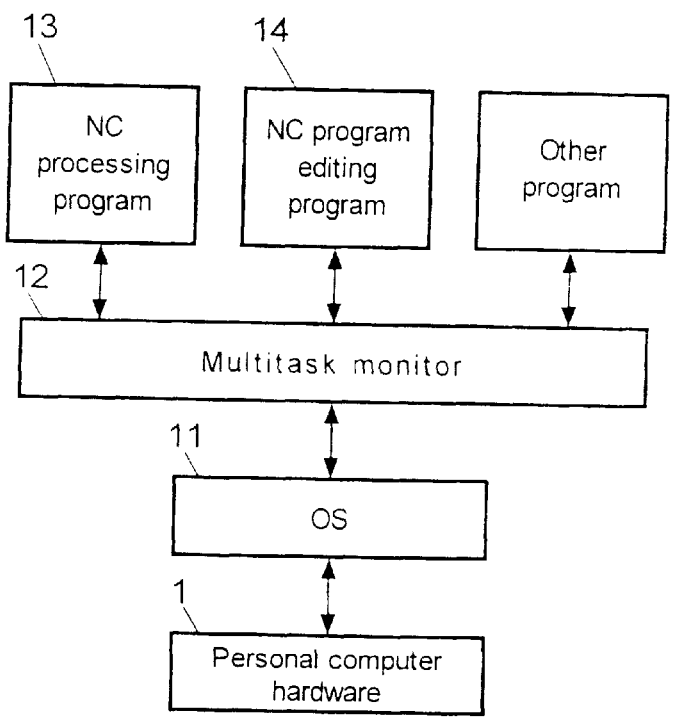
FIG. 2 shows an example of an NC program.
FIG. 3 is a block diagram showing the structural arrangement of a personal computer in FIG. 1 and the structural arrangement of software in the personal computer.

FIG. 2 shows an example of an NC program for machining carried out with a machine tool. Such an NC program is input from the NC operating panel 10 and stored into the external storage 5, which is contained in the personal computer 1, according to an appropriate code (e.g., ASCII). It is also possible to use an NC program prepared by another NC system, a CAD/CAM system, etc. and saved to a flexible disk or a paper-tape. Such an NC program may be read by a flexible disk drive or a paper-tape reader provided on the NC operating panel 10 and stored in a hard disk unit provided as the external storage 5.

The NC program shown in Pig. 2 will be briefly described below. Number "01234" in the first row is the program number of this program. Number "N001" in the next row is the row number of an actual program portion. Number "G54 G90", which follows "N001", is an instruction portion of the program. The content of the instruction is as follows; G54 is an instruction for the system to select a workpiece coordinate system; and G90 is an instruction for the system to absolutely specify coordinate positions. A portion extending over from the sequence number to the semicolon ";" at the end of the row (i.e., End of Block: EOB) is called "block". Such NC instructions for the machine tool follow sequentially.

The CPU 21 in the motherboard 2 of the personal computer 1 loads into the main memory an NC program such as that shown in FIG. 2, which has been stored in the external storage 5, and analyzes the NC program to separate it into NC instructions block by block. Then, the CPU 21 converts each NC instruction into an instruction format which can be interpreted by the NC board 6, and sends instructions to the NC board 6 after confirming that the NC board 6 is in a receivable state for each instruction in each block. The NC board 6 executes pulse distribution according to the received NC instruction and sends a drive signal to a servo-amplifier of a control motor for each control axis. When the NC instruction buffer becomes ready to receive an NC instruction upon completion of the present NC instruction, the motherboard 2 is informed that the NC board 6 is in a receivable state. This operation is repeated for each block.

Row number "N002" in FIG. 2 instructs that the spindle should be rotated forward (M03) at 250 revolutions per minute (S250). This instruction is sent to the PLC board 7, and the PLC board 7 outputs a control signal to an external I/O board. Thus, NC instructions mixedly include those which are to be executed by the NC board 6 and those which are to be executed by the PLC board 7. The CPU 21 in the motherboard 2 may be arranged in order to properly distribute these instructions to the two boards. Alternatively, the structural arrangement may be such that the CPU 21 outputs the instructions to a common I/O address on the main bus 3, and each board discriminately accepts an instruction issued thereto and executes it.

Number "G00 X0 Y0" in row number "N003" is an instruction for the rapid traverse as far as the coordinate position of (X,Y)=(0,0) (there is no change for the Z axis). Row number "N004" is an instruction for the rapid traverse as in the case of row "N003", although G00 (modal G code) is omitted. That is, rapid traverse is performed as far as the coordinate position of (X,Y,Z)=(0,0,−9.8). Number "G01" in row "N005" is an instruction for the cutting feed by linear interpolation. Number "G03" in row "N006" is an instruction for the cutting feed by circular interpolation. Row number "N007" and row number "N008" are G00 instructions (i.e., instructions for rapid traverse).

In the case of an instruction which is not accompanied by machining of the workpiece (such as, G00 (rapid traverse instruction)), even if a wait occurs between the termination of this instruction and the execution of a subsequent instruction, no actual harm is done to the workpiece. However, in the case of an instruction wherein cutting of the workpiece is in progress at the time of termination of that block (such as, row number "N005" or row number "N006", it is necessary to execute the subsequent instruction without a time delay so that the machining operation continues smoothly. If a time delay occurs between the termination of the present instruction and the execution of the subsequent instruction, an adverse effect is produced on the machined surface of the workpiece, for example, a feed mark due to discontinuous feed.

FIG. 3 shows the arrangement of software executed by the CPU 21 of the personal computer 1. Direct access to hardware of the personal computer 1 (such as, the external storage 5, the NC board 6, the PLC board 7, etc.) is made by an OS (Operation System) 11, which is basic software, as a general rule. Where the OS 11 is a simple one, it does not support multitask processing. Therefore, a multitask monitor 12 is operated in order to execute multitask processing, while maintaining satisfactory real-time performance required for the NC system.

An NC processing program 13 is executed as one of the tasks performed by a multitasking operation. The NC processing program 13 loads into the main memory 22 an NC program such as that shown in FIG. 2, which has been stored in the external storage 5 as described above. The NC processing program 13 processes the NC program block by block, and sends instruction data to the NC board 6 or the PLC board 7. A block for which the NC processing program 13 has completed analysis and processing and is going to send instruction data to the NC board 6 or the PLC board 7 is referred to as "execution block". When instruction data in an execution block is sent to the NC board 6 or the PLC board 7, control (according to the instruction data in that block) is effected with respect to the machine tool. The execution block is sent out through the multitask monitor 12.

An NC program editing program 14 is executed as another task in the multitasking operation. The editing program 14 enables the operator to input an NC program for another machining operation from the NC operating panel 10 even during NC machining, and to edit the NC program and save the edited NC program to a magnetic disk or the like as the external storage 5, or to read an NC program other than the one that is being executed from the magnetic disk or the like in order to modify the readout NC program. When the magnetic disk or the like is accessed in this way, the processing performed by the CPU 21 is monopolized by the disk access, making it impossible to execute other processing during the disk access. If a wait occurs owing to such disk access, the machining process may be adversely affected depending upon the type of NC instruction being executed. Therefore, any disk access is executed through the multitask monitor 12.

The multitask monitor 12 restricts access made to a magnetic disk or the like, which is represented by a hard disk, to avoid an adverse effect on machining carried out according to an NC program being executed. The multitask monitor 12 corresponds to the access control means in the invention claimed in claim 3. The main memory 22 contains an instruction type storage table for storing NC instructions which are classified into waitable instructions for allowing a wait between execution thereof and execution of an NC instruction in the subsequent block, and unwaitable instructions which disallow a wait between execution thereof and execution of an NC instruction in the subsequent block. The instruction type storage table corresponds to the instruction type storage means in the invention claimed in claim 3. In the NC program shown in FIG. 2, G54, G90, S250, M03, G00, etc. may be defined as waitable instructions, and machining instructions (such as, G01 and G03) may be defined as unwaitable instructions.

Figure 4:
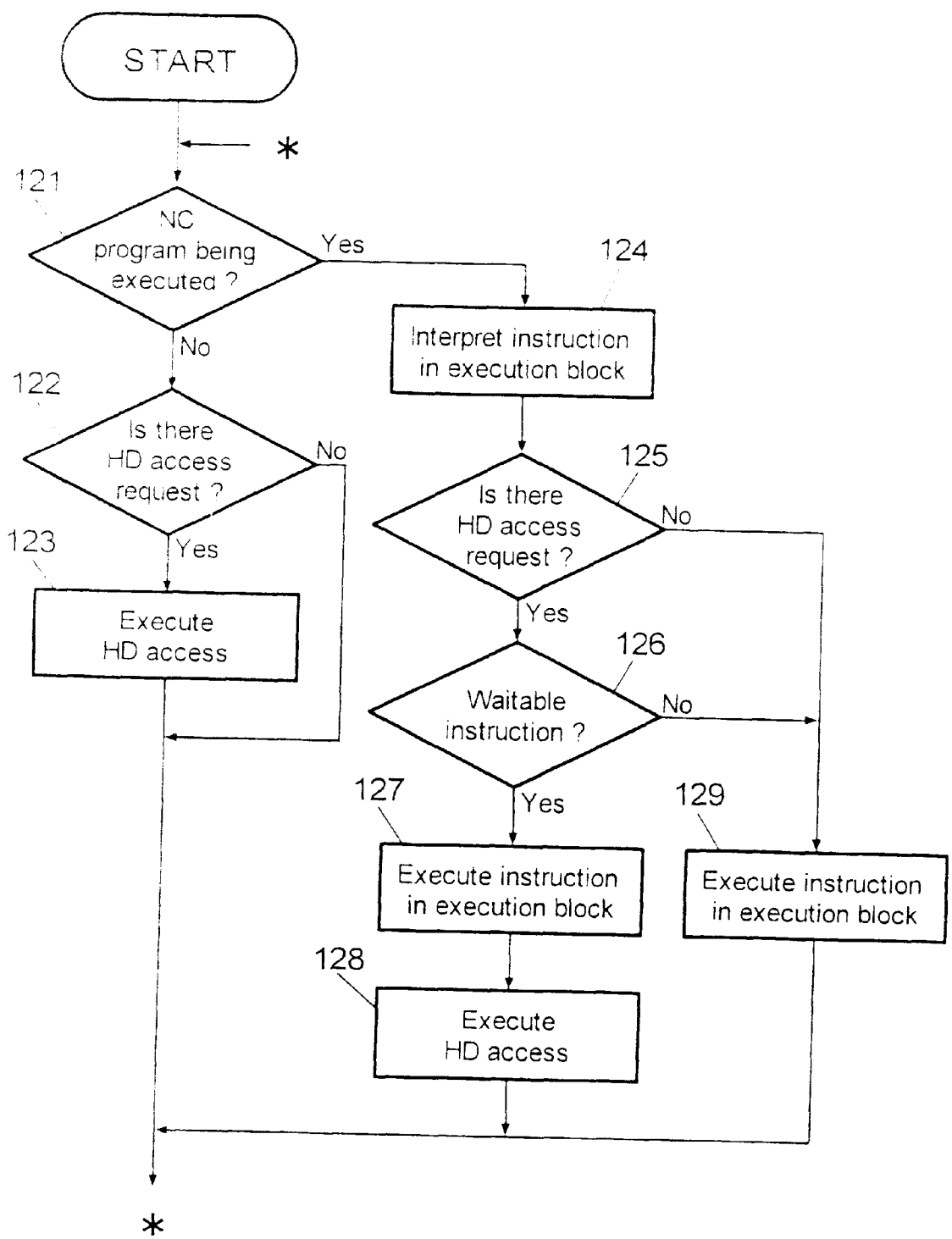
FIG. 4 is a flowchart showing processing executed by a multitask monitor in FIG. 3.

FIG. 4 is a flowchart showing disk access and execution block sending processing carried out by the multitask monitor 12. At step 121, the multitask monitor 12 judges whether or not an NC program is being executed. If "No" (that is, if no NC program is being executed), the multitask monitor 12 executes ordinary disk access. That is, it is judged at step 122 whether or not there is a request for disk access from a task. If there is a disk access request, the multitask monitor 12 executes disk access at step 123. Thereafter, the process returns to the start of the processing. If "Yes" is the answer at step 121, the process proceeds to step 124, at which time the multitask monitor 12 interprets an NC instruction in an execution block delivered from the NC processing program 13. Next, it is judged, at step 125, whether or not there is a request for disk access from a task. If "No" (that is, if there is no disk access request), the process proceeds to step 129, at which time the multitask monitor 12 does not execute disk access, but sends the execution block to the NC board 6 or other board to execute it. Thereafter, the process returns to the start of the processing.

If "Yes" is the answer at step 125, the multitask monitor 12 judges, at step 126, whether or not the NC instruction in the execution block is a waitable instruction by referring to the instruction type storage table in the main memory 22. If "No" (that is, if the NC instruction in the execution block is an unwaitable instruction), the multitask monitor 12 does not execute disk access but sends the execution block to the NC board 6 or other board to execute it. The disk access is placed in a wait state until processing of a waitable instruction is executed. That is, during the execution of an unwaitable instruction, disk access is not executed, and a wait due to disk access does not occur. If "Yes" is the answer at step 126, the execution block is sent to the NC board 6 or other board and executed at step 127. Thereafter, disk access is executed at step 128. In this case, even if a wait occurs owing to the disk access, there is no adverse effect on the machining presently carried out because the instruction being executed is a waitable instruction. After step 128 or step 129, the process returns to the start of the processing.

Although the NC system according to the foregoing embodiment uses a personal computer, it should be noted that the present invention is also applicable to an NC system which does not use a personal computer, provided that it has a first storage means (e.g. a semiconductor memory), and a second storage means (e.g. a magnetic disk unit), which has an access time longer than that of the first storage means.

The present invention, arranged as described above, provides the following advantages:

Even in multitask processing, numerical control is not adversely affected by a wait due to access to a storage means having a long access time. In control of a machine tool, the present invention prevents the machining quality from degrading and enables the machine tool to be improved in performance and reliability.

It is possible to employ an inexpensive storage means having a long access time as a storage means used in a numerical-control and hence, it is possible to reduce the production cost of the numerical-control system.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A storage means access control method for a numerical-control system, said numerical-control system having first storage means and second storage means having an access time longer than that of the first storage means, wherein numerical-control instructions in blocks of a numerical-control program stored in the first storage means are sequentially executed block by block, said method comprising the steps of:
previously classifying the numerical-control instructions in the blocks of said numerical-control program into waitable instructions which allow a wait between execution thereof and execution of a numerical-control instruction in a subsequent block, and unwaitable instructions which disallow a wait between execution thereof and execution of a numerical-control instruction in a subsequent block;

judging, when there is a request for access to said second storage means during execution of said numerical-control program, whether or not a numerical-control instruction in an execution block, which is a block to be executed subsequently, is a waitable instruction, and, if the numerical-control instruction is a waitable instruction, executing access to said second storage means after the numerical-control instruction in the execution block has been executed; and executing, if the numerical-control instruction in the execution block is an unwaitable instruction, processing of a subsequent block after the numerical-control instruction in the execution block has been executed without executing access to said second storage means.

2. A storage means access control method according to claim 1, wherein said numerical-control system controls a machine tool, and wherein said waitable instructions are instructions which are not accompanied by machining of a workpiece, and said unwaitable instructions are instructions for said machine tool to machine a workpiece.

3. A numerical-control system having first storage means and second storage means having an access time longer than that of the first storage means, wherein numerical-control instructions in blocks of a numerical-control program stored in the first storage means are sequentially executed, i.e. converted into control signals, block by block, said numerical-control system comprising:
instruction type storage means for previously storing the numerical-control instructions in the blocks of said numerical-control program, said numerical-control instructions being classified into waitable instructions which allow a wait between execution thereof and execution of a numerical-control instruction in a subsequent block, and unwaitable instructions which disallow a wait between execution thereof and execution of a numerical-control instruction in a subsequent block; and access control means for judging, when there is a request for access to said second storage means during execution of said numerical-control program, whether or not a numerical-control instruction in an execution block, which is a block to be executed subsequently, is a waitable instruction, and, if the numerical-control instruction is a waitable instruction, executing access to said second storage means after the numerical-control instruction in the execution block has been executed, and for executing, if the numerical-control instruction in the execution block is an unwaitable instruction, processing of a subsequent block after the numerical-control instruction in the execution block has been executed without executing access to said second storage means.

4. A numerical-control system according to claim 3, which controls a machine tool, and wherein said waitable instructions are instructions which are not accompanied by machining of a workpiece, and said unwaitable instructions are instructions for said machine tool to machine a workpiece.

5. A numerical-control system according to claim 3, wherein said first storage means is a semiconductor memory, and said second storage means is an external storage.

* * * * *